United States Patent
Liu et al.

(10) Patent No.: US 12,353,931 B2
(45) Date of Patent: Jul. 8, 2025

(54) RFID LABEL PRINTER AND METHOD FOR READING AND WRITING RFID LABEL

(71) Applicant: Wuhan Jingchen Intelligent Identification Technology Co., Ltd., Wuhan (CN)

(72) Inventors: Xiong Liu, Hanchuan (CN); Yongqiang Zhang, Wuhan (CN); Hao Yu, Wuhan (CN); Jianwen Jiang, Wuhan (CN); Zhe Zhang, Wuhan (CN)

(73) Assignee: Wuhan Jingchen Intelligent Identification Technology Co., Ltd., Wuhan (CN)

( * ) Notice: Subject to any disclaimer, the term of this patent is extended or adjusted under 35 U.S.C. 154(b) by 0 days.

(21) Appl. No.: 18/430,425

(22) Filed: Feb. 1, 2024

(65) Prior Publication Data
US 2025/0068862 A1    Feb. 27, 2025

(30) Foreign Application Priority Data
Aug. 21, 2023 (CN) .......................... 202311051606.3

(51) Int. Cl.
G06K 7/00    (2006.01)
G06K 1/12    (2006.01)

(52) U.S. Cl.
CPC .................................. G06K 1/121 (2013.01)

(58) Field of Classification Search
CPC ........................................................ G06K 1/121
See application file for complete search history.

(56) References Cited

U.S. PATENT DOCUMENTS

2009/0231142 A1* 9/2009 Nikitin ................. G06K 7/0008
340/572.8

* cited by examiner

Primary Examiner — Jamara A Franklin
(74) Attorney, Agent, or Firm — Inskeep IP Group, Inc.

(57) ABSTRACT

Disclosed is an RFID label printer and a method for reading and writing an RFID label using an RFID label printer, the RFID label printer includes: a first antenna, a paper cartridge and a control module for reading and writing, the paper cartridge is used to accommodate a label roll paper, the label roll paper includes a plurality of labels having a first RFID chip, and the control module for reading and writing is configured to perform steps of reading and writing.

9 Claims, 3 Drawing Sheets

--- controlling the label to travel to a preset position for reading and writing, and controlling the first antenna to recognize the first RFID chip of the label with a first preset power — S101 if a unique first RFID chip is not recognized, a power for reading and writing is progressively increased from the first preset power until the unique first RFID chip is recognized, otherwise, this step is skipped — S102 acquiring an identification code of the unique first RFID chip, assigning the identification code to the first antenna, and reading and writing the first RFID chip corresponding to the identification code with a second preset power, wherein the second preset power is greater than the first preset power and a power when the unique first RFID chip is recognized — S103

RFID LABEL PRINTER AND METHOD FOR READING AND WRITING RFID LABEL

CROSS-REFERENCE TO RELATED APPLICATIONS

This application claims priority to Chinese Patent Application No. 202311051606.3, filed on Aug. 21, 2023. The disclosure of the application is incorporated herein for all purposes by reference in its entirety.

TECHNICAL FIELD

The present disclosure belongs to the field of printing, and more specifically, relates to a kind of RFID label printer and its reading and writing method.

BACKGROUND

RFID (Radio Frequency Identification) label printers can print labels with an RFID chip. On the one hand, visual information can be printed onto a label surface, and on the other hand, the RFID chip of the label can be read and written.

A type of label has an RFID chip that operates in the UHF (Ultra High Frequency) band. It is advantageous that this UHF band allows reading and writing multiple labels simultaneously, that is, it supports "one-to-many" mode, which may improve efficiency, especially in scenarios such as inventory management where such labels are used. However, in other scenarios such as label printing, one particular label is typically selected to be read and written. That is, data is read from and written to only the label currently being printed, also called as "one-to-one" mode.

In process of reading and writing a label, a power for reading and writing is crucial. In an existing RFID printer that uses UHF band to read and write, a constant power for reading and writing is provided to recognize an RFID chip and then read and write it. In other words, a power for reading and writing is substantially constant during printing process of a label roll paper, and the power for reading and writing is not changed when a user replaces the label roll paper to print and read and write, unless the user manually reset the power for reading and writing.

Such constant power for reading and writing in prior art may cause a problem that some labels cannot be read or written, or multiple labels are read and written simultaneously, which makes some labels of a label roll paper unable to be successfully recognized, read and written, resulting in a low overall reading and writing success rate. Especially when a user uses different batches of label rolls to print, abnormalities in recognition, reading and writing are particularly frequent. There may be differences in RFID chips of one label roll or different label rolls, such that a predetermined constant power may be suitable for some labels, but not suitable for other labels. If the power is increased, a nearby label may be mistakenly matched due to the "one-to-many" mode of the UHF band, causing that date is not written into a desired RFID chip but mistakenly written into an RFID chip of the nearby label, or multiple labels may be simultaneously matched such that data is mistakenly written. If the power is decreased, there is a risk of failing to recognize, read and write some labels. Given the high manufacturing cost of labels with UHF band, any anomalies in printing, reading and writing can lead to significant resource and cost wastage for customers.

Some RFID printers with adjustable power for reading and writing have been proposed in prior art, but it is required to further improve success rates and accuracy of reading and writing.

SUMMARY

In view of the above defects of the prior art or improvement needs, the present disclosure provides an RFID label printer and a method for reading and writing an RFID label using an RFID label printer, which can improve the reading and writing success rate and accuracy of the RFID label printer.

In order to achieve the above object, according to one aspect of the present disclosure, a RFID label printer is provided, including: a first antenna, a paper cartridge and a control module for reading and writing, the paper cartridge is used to accommodate a label roll paper, the label roll paper includes a plurality of labels having a first RFID chip, and the control module for reading and writing is configured to perform steps of reading and writing including:
  controlling the label to travel to a preset position for reading and writing, and controlling the first antenna to recognize the first RFID chip of the label with a first preset power;
  if a unique first RFID chip is not recognized, a power for reading and writing is progressively increased from the first preset power until the unique first RFID chip is recognized, otherwise, this step is skipped; and
  acquiring an identification code of the unique first RFID chip, assigning the identification code to the first antenna, and reading and writing the first RFID chip corresponding to the identification code with a second preset power, wherein the second preset power is greater than the first preset power and greater than a power when the unique first RFID chip is recognized.

In some embodiments, the RFID label printer further includes a determination module configured to, before the steps of reading and writing, perform a step of determining the first preset power and a step of determining the preset position for reading and writing including:
  obtaining a length information of a single label in a traveling direction, and controlling the label to travel to a reference position according to the length information;
  obtaining attribute information of the label roll paper, and determining the first preset power according to the attribute information of the label roll paper; and
  controlling the label to travel a preset distance from the reference position, and controlling the first antenna to recognize the first RFID chip of the label with the first preset power multiple times during the process of traveling the preset distance, so that a position where the recognition signal is strongest is selected as the preset position for reading and writing.

In some embodiments, the RFID label printer further includes a second antenna, and the label roll paper includes a second RFID chip, wherein the length information and the attribute information are obtained by reading the second RFID chip with the second antenna.

In some embodiments, the reference position is a starting position of the label, and the preset distance is the length of the single label in the traveling direction.

In some embodiments, determining the first preset power according to the attribute information includes: obtaining mapping relationships between different attribute information and first preset powers, such that the first preset power is determined according to the attribute information of the label roll paper and the mapping relationship.

In some embodiments, the first preset power is configured such that the first antenna is capable of recognizing the first RFID chips of half or more labels of the label roll paper with the first preset power when the label travels to the preset position for reading and writing, while the first antenna cannot simultaneously recognize the first RFID chips of two labels; and wherein the second preset power is configured such that the first antenna is capable of recognizing all the first RFID chips with the second preset power when the label travels to the preset position for reading and writing.

In some embodiments, after detecting that the label roll paper is replaced, the step of determining the first preset power and the step of determining the preset position for reading and writing are performed for a new label roll paper, and the steps of reading and writing are performed for each label of the new label roll paper.

In some embodiments, the first RFID chip is a UHF chip, the first antenna is a UHF antenna, the second RFID chip is an NFC chip, and the second antenna is an NFC antenna.

In some embodiments, progressively increasing the power for reading and writing from the first preset power includes providing a power increment rule, so that the power for reading and writing is increased from the first preset power according to the power increment rule.

A method for reading and writing using an RFID label printer is provided, wherein the RFID label printer includes a first antenna, a paper cartridge and a control module for reading and writing, the paper cartridge is used to accommodate a label roll paper including a plurality of labels, the method for reading and writing includes steps of reading and writing including:

controlling the label to travel to a preset position for reading and writing, and controlling the first antenna to recognize the first RFID chip of the label with a first preset power;

if a unique first RFID chip is not recognized, progressively increasing a power for reading and writing from the first preset power until the unique first RFID chip is recognized, otherwise, this step is skipped; and acquiring an identification code of the unique first RFID chip, assigning the identification code to the first antenna, and reading and writing the first RFID chip corresponding to the identification code with a second preset power, wherein the second preset power is greater than the first preset power and greater than a power when the unique first RFID chip is recognized.

Generally speaking, the above technical solutions conceived by the present disclosure have beneficial effects compared with the prior art: the present disclosure adopts a read and write power adjustment strategy that is different from the prior art, by progressively increasing a power for reading and writing from the first preset power, and by reading and writing the first RFID chip corresponding to the identification code with a second preset power, success rate and accuracy of label identification are greatly improved, which greatly avoids misidentification, misreading and writing, and avoids scrapping caused by abnormal reading and writing of labels. In addition, because the success rate and accuracy of label recognition reading and writing are improved, it also avoids printing problems such as printing pauses and forced termination caused by abnormal reading and writing when printing labels in large quantities.

DETAILED DESCRIPTION

In order to make the purpose, technical solutions and advantages of the present disclosure clearer, the present disclosure will be described in detail below in conjunction with the accompanying drawings and embodiments. It should be understood that the specific embodiments described here are only used to explain the present disclosure and are not intended to limit the present disclosure. In addition, the technical features involved in the various embodiments of the present disclosure described below can be combined with each other as long as they do not conflict with each other.

In addition, terms "first" and "second" are only used for descriptive purposes and cannot be understood as indicating or implying priority or a number of the technical features. In the description of the present disclosure, term "plurality of" means at least two, such as two, three, etc., unless otherwise expressly and specifically limited.

The present disclosure discloses an RFID label printer and a method for reading and writing using an RFID label printer, which will be described respectively below.

Figure 1:
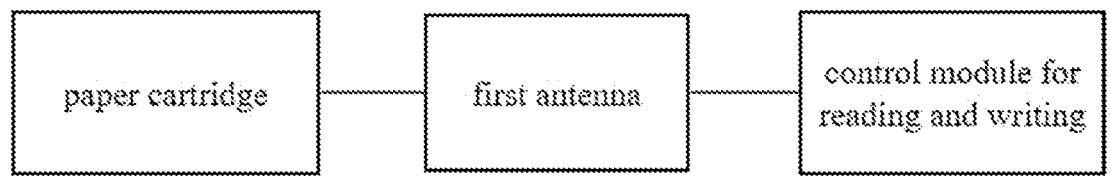
FIG. 1 is a schematic diagram of modules of an RFID label printer according to an embodiment.

As shown in FIG. 1, an RFID label printer according to an embodiment of the present disclosure includes a first antenna, a paper cartridge and a control module for reading and writing.

The paper cartridge is used to accommodate a label roll. The paper cartridge may be constructed as any structure in prior art.

The label roll includes a plurality of labels having a first RFID chip.

The first antenna is used to read data from and write data to the first RFID chip. When the RFID label printer prints the label with the first RFID chip, on the one hand, visual information may be printed on a label surface, and on the other hand, the first RFID chip of the label may be read and written.

Figure 3:
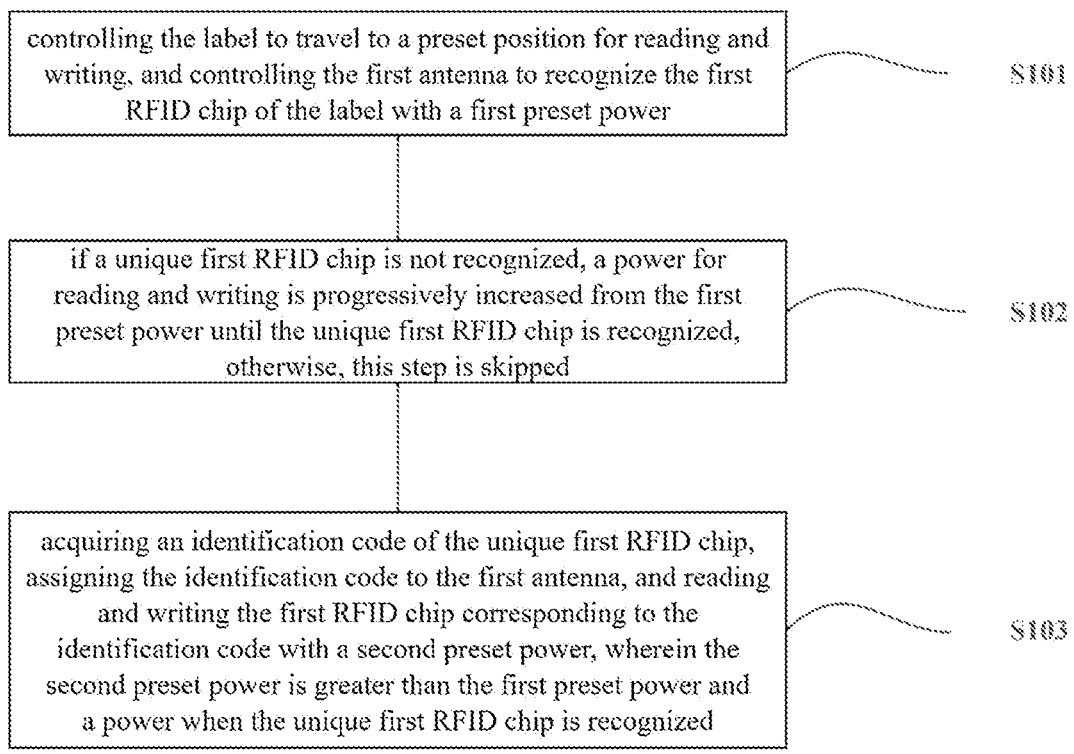
FIG. 3 shows execution steps of a control module for reading and writing according to an embodiment.

As shown in FIG. 3, the control module for reading and writing is configured to perform reading and writing steps, and the reading and writing steps include the following steps:

S101, controlling the label to travel to a preset position, and controlling the first antenna to search for a label (i.e., to recognize the first RFID chip of the label) with a first preset power.

The preset position is a predetermined position at which reading and writing operations are performed.

The searching step is initially performed at the first preset power which is lower than a second preset power at which reading and writing steps are performed after assigning an identification code. In this way, it is impossible to recognize a plurality of first RFID chips at the beginning, but to recognize a unique first RFID chip or no first RFID chip.

S102, if no first RFID chip is recognized, the first preset power is progressively increased until a unique first RFID chip is recognized. Otherwise, this step is skipped.

Due to possible difference of the first RFID chips of the labels, the first preset power may be suitable for some labels, but not suitable for the remained labels.

If a unique first RFID chip is recognized when searching at the first preset power, the step S102 is skipped as the first preset power is suitable for the current label to be read and written.

If a unique first RFID chip is not recognized when searching at the first preset power, the first preset power is progressively increased (e.g. by 1 db each time) as the first preset power is insufficient for the current label to be read and written.

During progressively increasing the power, a case that a plurality of RFID chips are recognized indicates the current power being too large for the current label to be read and written, and a case that only a unique first RFID chip is recognized indicates the current power being suitable for the current label to be read and written.

S103, acquiring an identification code of the unique first RFID chip, assigning the identification code to the first antenna, and reading and writing the first RFID chip corresponding to the identification code with a second preset power. The second preset power is greater than the first preset power and greater than the power when the unique first RFID chip is recognized.

The identification code may be a TID code (label identification number) of the first RFID chip.

After acquiring the identification code, the identification code is assigned to the first antenna so that a "one-to-one" relationship is established between the first antenna and the first RFID chip, and then the first RFID chip corresponding to the identification code is read and written at the second preset power. Even if the second preset power is greater than the first preset power and greater than the power when recognizing the unique first RFID chip, simultaneously responding to a plurality of first RFID chips will not occur as the "one-to-one" relationship is established, which greatly improves the success rate and accuracy of reading and writing. Due to the fact that the second preset power is greater than the first preset power and greater than the power when recognizing the unique first RFID chip, the higher second preset power results in more powerful read and write signals, so that reading and writing stabilities are better.

Figure 2:
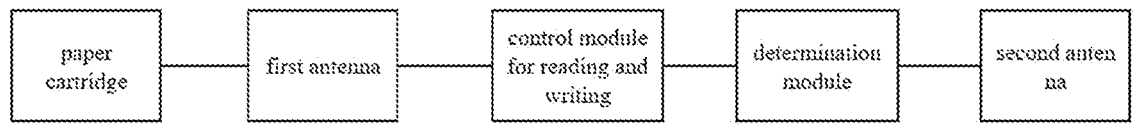
FIG. 2 is a schematic diagram of modules of an RFID label printer according to another embodiment.
Figure 4:
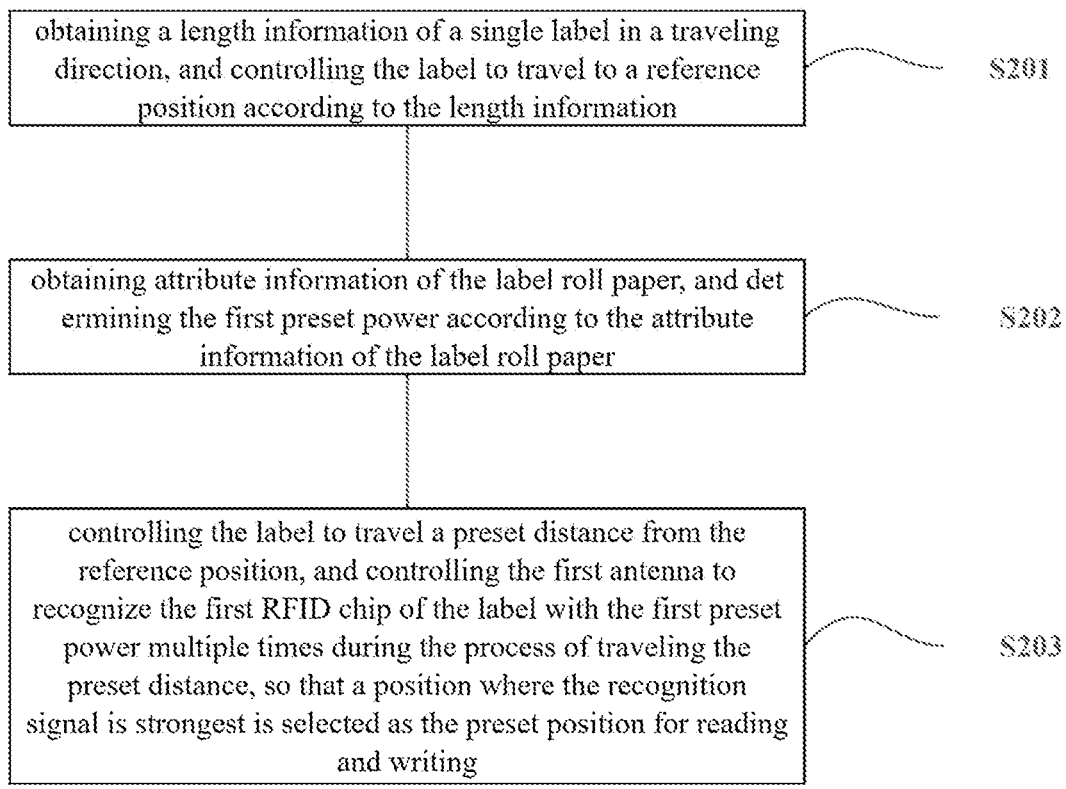
FIG. 4 shows execution steps of a determination module according to an embodiment.

As shown in FIG. 2, a determination module is further included, which is used to perform steps of determining the first preset power and the preset position before reading and writing steps (as shown in FIG. 4), which includes the following steps.

S201, obtaining a length information of a single label in a traveling direction, and controlling the label to travel to a reference position according to the length information.

Various implement means may be provided to obtain the length information of the single label in the traveling direction. For example, the length information of the single label in the traveling direction can be calculated based on distance difference between two ends of the single label which can be detected along the traveling direction by a sensor during the travel of the label paper.

After obtaining the length information of the single label in the traveling direction, a position of the label can be determined according to the length information, and the label can be controlled to travel to the reference position.

The reference position is a position used as a reference, which may be an end of the label paper, for example.

S202, obtaining attribute information of the label roll paper, and determining the first preset power according to the attribute information of the label roll paper.

The attribute information of the label roll paper is used to distinguish different types of label roll papers, which can involve, such as, model and material of the label roll paper.

An RFID label printer can be adapted to a variety of label roll papers. For the same label roll paper, labels of which are of same model and material, and the differences in the first RFID chips of the labels will be small. However, for different types of label roll papers, models and materials of the labels of which are different, and the differences in the first RFID chips of these labels will be relatively lager. If a first preset power is constantly applied for different types of label roll papers, there is a problem that the constant first preset power may be not suitable for all labels of a certain type of label roll paper. In this case, a power for reading and writing may be determined by progressively increased from the aforementioned constant first preset power, resulting in longer reading and writing times.

For this purpose, differentiated first preset powers can be set for different types of label roll papers according to an embodiment of the present disclosure. Specifically, a corresponding first preset power is determined according to the attribute information of the label roll paper.

S203, controlling the label to continue traveling a preset distance from the reference position, and controlling the first antenna to recognize the first RFID chip of the label with the first preset power multiple times during the process of traveling the preset distance, so that a position where the recognition signal is the strongest is selected as a preset position for reading and writing.

Since the label and the first RFID chip thereof each have a certain length, the recognition effect is different when the label is in different positions, even if the same power for reading and writing is used. Therefore, the position corresponding to the strongest recognition signal is selected as the preset position for reading and writing in step S101.

Through steps S202 and S203, the preset position for reading and writing and the first preset power in step S101 are most suitable for the current label roll paper, which further improves the reading and writing success rate, and also improves reading and writing speed.

In some embodiments, the RFID label printer also includes a second antenna, the label roll paper also includes a second RFID chip, and the second RFID chip is read through the second antenna to obtain the length information and the attribute information.

That is, the second RFID chip is used to store the attribute information of the label roll paper and the length information of the label, and the second antenna is used to recognize the second RFID chip and obtain the attribute information of the label roll paper and the length information of the label.

In some embodiments, the reference position is a starting position of the label, and the preset distance may be configured as the length of the single label in the traveling direction.

In some embodiments, determining the first preset power according to the attribute information includes the steps:

Determining mapping relationships between different attribute information and first preset powers, such that the first preset power may be determined according to the attribute information of the label roll paper and the mapping relationship.

The mapping relationships between different attribute information and the first preset powers can be determined through testing, so that corresponding first preset powers which correspond to different attribute information of the label roll paper is determined through testing.

In some embodiments, if the first preset power is designed such that the first antenna is capable of recognizing the first RFID chips of half or more labels of the label roll paper with the first preset power when the label travels to the preset position for reading and writing, while the first antenna is not capable of simultaneously recognizing the first RFID chips of two labels, step S102 may be skipped for the half or more labels of the label roll paper, which can speed up the reading and writing speed of continuous printing and improve printing efficiency.

The first antenna being capable of recognizing the first RFID chips of half or more labels of the label roll paper with the first preset power does not mean that the first antenna is capable of simultaneously recognizing the first RFID chips of half or more labels of the label roll paper with the first preset power, but means that the first antenna is capable of recognizing half or more labels which travel to the preset position for reading and writing.

The second preset power is designed such that the first antenna is capable of recognizing all the first RFID chips with the second preset power when the label travels to the preset position for reading and writing.

The first antenna being capable of recognizing all the first RFID chips with the second preset power does not mean that the first antenna is capable of simultaneously recognizing the first RFID chips of all labels of the label roll paper with the second preset power, but means that the first antenna is capable of recognizing all labels which travel to the preset position for reading and writing. It can be appreciated that fault labels are excluded.

In some embodiments, after detecting that the label roll paper is replaced, the steps of determining the first preset power and the preset position for reading and writing are performed for the new label roll paper, and then the reading and writing steps are performed on each label respectively.

That is, for a single roll of label roll paper, it is only necessary to perform a step of determining the first preset power once and a step of determining preset position for reading and writing once, rather than repeating these steps for each label. However, the reading and writing steps need to be performed separately for every label. Due to the fact that the difference between labels of a label roll paper is relatively small, performing the reading and writing steps for each label to adjust the power for reading and writing is sufficient to compensate for the difference, which can not only increase the read and write speed, but also improve reading and writing success rate. In the case of different label roll papers, merely adjusting the power for reading and writing is insufficient to compensate for the difference, it also requires the steps for adjusting the first preset power and the preset position for reading and writing which are advantageous for compensating for the difference.

In some embodiments, the first RFID chip is a UHF chip, the first antenna is a UHF antenna, the second RFID chip is an NFC (Near Field Communication) chip, and the second antenna is an NFC antenna.

In some embodiments, progressively increasing the power for reading and writing from the first preset power includes steps: providing a power increment rule, so that the power for reading and writing may be increased from the first preset power according to the power increment rule. The power increment rule may be set, for example, increasing by 1 db each time.

In one embodiment, the RFID label printer is connected to a printing APP. After receiving printing, reading and writing instructions, starting the reading and writing steps including:

after receiving instructions for reading and writing, controlling the first antenna to search for a label, i.e., to recognize a first RFID chip of the label;

adjusting a power of the first antenna to the first preset power, that is, starting searching for the label with a lower power (such as, 12 db), and determining whether a unique first RFID chip is recognized;

if the unique first RFID chip is not recognized (which indicates that the current power for reading and writing is inadequate), increasing the searching power by 1 Db for the next recognition, and continuing increasing if failing to recognize the unique first RFID chip; and if the unique first RFID chip is recognized, going to the next step. Generally, the unique first RFID chip is successfully recognized when the power for reading and writing increases to an appropriate value;

after recognizing the unique first RFID chip, the first RFID chip sends a TID code thereof; and reading and writing data with a higher power for reading and writing based on at least the TID code, which ensures accurate reading and writing of data; and stopping energizing the first antenna.

A method for reading and writing using an RFID label printer according to an embodiment is provided, wherein the RFID label printer includes a first antenna, a paper cartridge and a control module for reading and writing, the paper cartridge is used to accommodate a label roll paper, the label roll paper includes a plurality of labels. The method for reading and writing includes steps of reading and writing including:

controlling the label to travel to a preset position for reading and writing, and controlling the first antenna to recognize a first RFID chip of the label with a first preset power;

if a unique first RFID chip is not recognized, a power for reading and writing is progressively increased from the first preset power until the unique first RFID chip is recognized, otherwise, this step is skipped;

acquiring an identification code of the unique first RFID chip, assigning the identification code to the first antenna, and reading and writing the first RFID chip corresponding to the identification code with a second preset power, wherein the second preset power is greater than the first preset power and greater than a power when the unique first RFID chip is recognized.

In some embodiments, before the reading and writing steps, performing steps of determining the first preset power and the preset position for reading and writing, including:

obtaining a length information of a single label in a traveling direction, and controlling the label to travel to a reference position according to the length information;

obtaining attribute information of the label roll paper, and determining the first preset power according to the attribute information of the label roll paper; and controlling the label to travel a preset distance from the reference position, and controlling the first antenna to recognize the first RFID chip of the label with the first preset power multiple times during the process of traveling the preset distance, so that a position where the recognition signal is strongest is selected as a preset position for reading and writing.

In some embodiments, the first preset power is designed such that the first antenna is capable of recognizing the first RFID chips of half or more labels of the label roll paper with the first preset power, while the first antenna cannot simultaneously recognize the first RFID chips of two labels.

The method for reading and writing using an RFID label printer can be understood with reference to the aforementioned RFID label printer.

It can be appreciated that the above are only preferred embodiments of the present disclosure, and are not intended to limit the present disclosure. Any modifications, equivalent substitutions and modifications made within the spirit and principles of the present disclosure should be included in the protection scope of the present disclosure.

What is claimed is:

1. An RFID label printer, comprising: a first antenna, a paper cartridge and a control module for reading and writing, the paper cartridge is used to accommodate a label roll paper, the label roll paper includes a plurality of labels having a first RFID chip, and the control module for reading and writing is configured to perform steps of reading and writing including:

controlling the label to travel to a preset position for reading and writing, and controlling the first antenna to recognize the first RFID chip of the label with a first preset power;

if a unique first RFID chip is not recognized, a power for reading and writing is progressively increased from the first preset power until the unique first RFID chip is recognized, otherwise, this step is skipped;

acquiring an identification code of the unique first RFID chip, assigning the identification code to the first antenna, and reading and writing the first RFID chip corresponding to the identification code with a second preset power, wherein the second preset power is greater than the first preset power and greater than a power when the unique first RFID chip is recognized; and wherein progressively increasing the power for reading and writing from the first preset power includes providing a power increment rule, so that the power for reading and writing is increased from the first preset power according to the power increment rule.

2. The RFID label printer according to claim 1, further comprising a determination module configured to, before the steps of reading and writing, perform a step of determining the first preset power and a step of determining the preset position for reading and writing including:

obtaining a length information of a single label in a traveling direction, and controlling the label to travel to a reference position according to the length information;

obtaining attribute information of the label roll paper, and determining the first preset power according to the attribute information of the label roll paper; and controlling the label to travel a preset distance from the reference position, and controlling the first antenna to recognize the first RFID chip of the label with the first preset power multiple times during the process of traveling the preset distance, so that a position where the recognition signal is strongest is selected as the preset position for reading and writing.

3. The RFID label printer according to claim 2, further comprising a second antenna, and the label roll paper includes a second RFID chip, wherein the length information and the attribute information are obtained by reading the second RFID chip with the second antenna.

4. The RFID label printer according to claim 3, wherein the first RFID chip is a UHF chip, the first antenna is a UHF antenna, the second RFID chip is an NFC chip, and the second antenna is an NFC antenna.

5. The RFID label printer according to claim 2, wherein the reference position is a starting position of the label, and the preset distance is the length of the single label in the traveling direction.

6. The RFID label printer according to claim 2, wherein determining the first preset power according to the attribute information includes: obtaining mapping relationships between different attribute information and first preset powers, such that the first preset power is determined according to the attribute information of the label roll paper and the mapping relationship.

7. The RFID label printer according to claim 1, wherein the first preset power is configured such that the first antenna is capable of recognizing the first RFID chips of half or more labels of the label roll paper with the first preset power when the label travels to the preset position for reading and writing, while the first antenna cannot simultaneously recognize the first RFID chips of two labels; and wherein the second preset power is configured such that the first antenna is capable of recognizing all the first RFID chips with the second preset power when the label travels to the preset position for reading and writing.

8. The RFID label printer according to claim 1, wherein after detecting that the label roll paper is replaced, the step of determining the first preset power and the step of determining the preset position for reading and writing are performed for a new label roll paper, and the steps of reading and writing are performed for each label of the new label roll paper.

9. A method for reading and writing an RFID label using an RFID label printer, wherein the RFID label printer includes a first antenna, a paper cartridge and a control module tor reading and writing, the paper cartridge is used to accommodate a label roll paper including a plurality of labels, the method for reading and writing an RFID label includes steps of reading and writing including:

controlling the label to travel to a preset position for reading and writing, and controlling the first antenna to recognize the first RFID chip of the label with a first preset power;

if a unique first RFID chip is not recognized, progressively increasing a power for reading and writing from the first preset power until the unique first RFID chip is recognized, otherwise, this step is skipped;

acquiring an identification code of the unique first RFID chip, assigning the identification code to the first antenna, and reading and writing the first RFID chip corresponding to the identification code with a second preset power, wherein the second preset power is greater than the first preset power and greater than a power when the unique first RFID chip is recognized; and wherein progressively increasing the power for reading and writing from the first preset power includes providing a power increment rule, so that the power for reading and writing is increased from the first preset power according to the power increment rule.

* * * * *